United States Patent
Devalla et al.

(10) Patent No.: US 7,774,305 B2
(45) Date of Patent: Aug. 10, 2010

(54) SYSTEM AND METHOD FOR AUDITING ENTERPRISE DATA

(75) Inventors: Raghuram Devalla, Chennai Tamil Nadu (IN); Srinivasan Sankaran, Tamil Nadu (IN); Srinivasan Ramaswamy, Chennai Tamil Nadu (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 423 days.

(21) Appl. No.: 11/073,799

(22) Filed: Mar. 7, 2005

(65) Prior Publication Data

US 2005/0203871 A1 Sep. 15, 2005

Related U.S. Application Data

(60) Provisional application No. 60/553,234, filed on Mar. 15, 2004.

(51) Int. Cl.
*G06F 17/00* (2006.01)
(52) U.S. Cl. ..................................... 707/609
(58) Field of Classification Search .............. 707/609, 707/648, 705, 721, 727, 768, 802
See application file for complete search history.

(56) References Cited

U.S. PATENT DOCUMENTS

| | | | |
|---|---|---|---|
| 5,680,602 A | | 10/1997 | Bloem et al. |
| 6,393,435 B1* | | 5/2002 | Gartner et al. ............. 707/200 |
| 6,405,212 B1* | | 6/2002 | Samu et al. ............. 707/103 R |
| 6,633,878 B1* | | 10/2003 | Underwood ................ 707/100 |
| 7,409,398 B1* | | 8/2008 | Flam et al. ........................ 1/1 |
| 7,451,148 B2* | | 11/2008 | Childress et al. .................... 1/1 |
| 2002/0188591 A1* | | 12/2002 | Santosuosso .................. 707/1 |
| 2003/0053459 A1* | | 3/2003 | Brouk et al. ................. 370/392 |
| 2003/0150908 A1* | | 8/2003 | Pokorny et al. ............. 235/375 |
| 2003/0220901 A1* | | 11/2003 | Carr et al. ...................... 707/1 |

FOREIGN PATENT DOCUMENTS

| | | |
|---|---|---|
| DE | 10003015 | 8/2000 |
| WO | 0182118 | 11/2001 |

OTHER PUBLICATIONS

Database Inspec 'Online! The Institution of Electrical Engineers, Stevenage, GB; Jun. 1998, Winter R: "Design and implementation of derivation rules in information systems" XP002332931 Database accession No. 5943192, abstract.
Data & Knowledge Engineering Elsevier Netherlands, vol. 26, No. 2, Jun. 1998, pp. 225-241, XP002332930 ISSN: 0169-023X, the whole document.

* cited by examiner

*Primary Examiner*—Fred I Ehichioya
(74) *Attorney, Agent, or Firm*—Prakash Nama; Global IP Services, PLLC

(57) ABSTRACT

A system and method for auditing enterprise data is disclosed. A non-intrusive enterprise application audit trail has the ability to configure and track only data that is selected, thereby conserving system resources. In one embodiment, a method includes providing one or more configuration facilities in an enterprise application, viewing configuration parameters, viewing modified enterprise data in the context of change management, and changing said configuration parameters so that data tracking in said enterprise application is performed only on select data. The method also includes invoking a database triggers facility to identify said select data to be tracked.

11 Claims, 4 Drawing Sheets

SYSTEM AND METHOD FOR AUDITING ENTERPRISE DATA

RELATED APPLICATION

Benefit is claimed under 35 U.S.C. 119(e) to U.S. Provisional Application Ser. No. 60/553,234, entitled "Flexible Approach for Auditing Enterprise Data" by inventor Raghuram Devella et al., filed Mar. 15, 2004, which is herein incorporated in its entirety by reference for all purposes.

TECHNICAL FIELD

The invention relates to enterprise software applications and data processed by such applications, and in particular, an audit trail to track changes made to that data.

BACKGROUND

Enterprise applications are constructed out of many interacting modules and functions that work together to enable a business to be more competitive in the market place. To accomplish this, enterprise applications depend on reference data and business data that are stored and persisted in a relational database system. By persisted, it is meant that the data is stored and maintained throughout the system so that those who use the system have access to all the data throughout the system. To maintain a properly functioning enterprise system then, it is crucial to keep track of changes to this data.

To keep track of the changes to this data, in virtually any enterprise application, an audit trail is maintained. In the context of an enterprise system, an audit trail refers to tracking changes made to the enterprise data on an information system. Indeed, in some cases, an audit trail is mandatory to audit information and/or data to ensure compliance with the pertinent laws of corporate governance. However, in contemporary enterprise systems, indiscriminate use of an audit trail feature leads to degradation in the performance of that system, since the storage of a plethora of enterprise data usurps system resources. Moreover, it is difficult to solve this problem by venturing into enterprise application code to alter the data that is audited and persisted, for such ventures could cause unforeseen problems in the functionality of the application.

DETAILED DESCRIPTION OF AN EMBODIMENT

In an enterprise application, the data that needs to be tracked is quite often dependent on the particular industry using the application. However, enabling all data for tracking without consideration being given to the industry that the enterprise system is being developed for leads to unnecessary overhead on the system. An embodiment of the invention therefore provides an intelligent system that ensures that data may be tracked on the requisite data for a particular application or industry, without having to modify any portion of the complex enterprise application.

Figure 1:
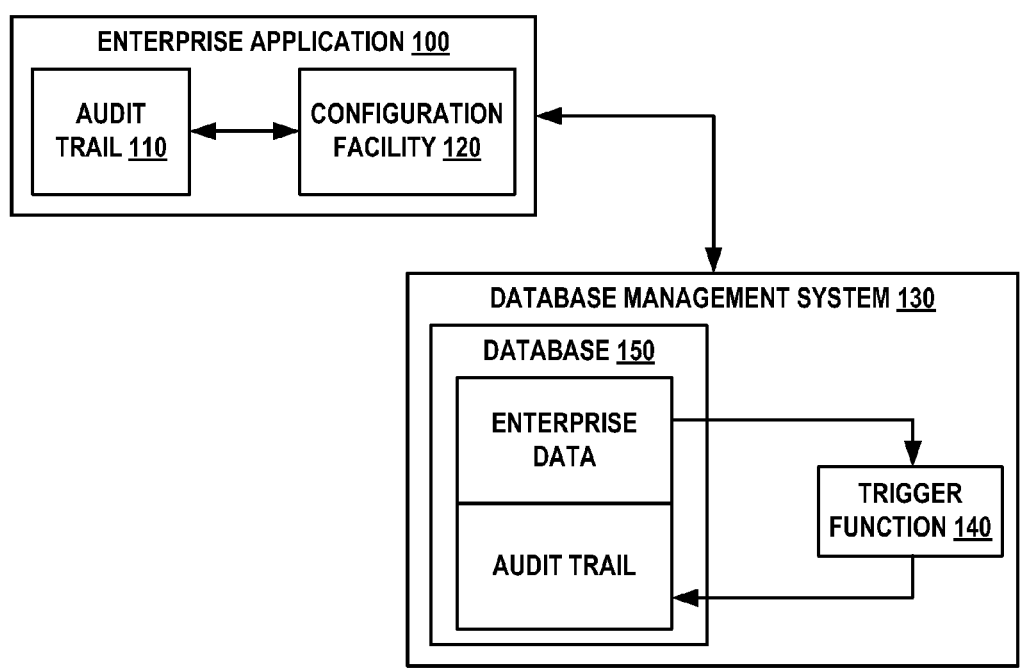
FIG. 1 is a block diagram of an embodiment of the invention.

FIG. 1 is a block diagram illustrating an embodiment of the invention. In FIG. 1, an enterprise application 100 has a configuration facility 120 that produces an audit trail 110 of the data in the enterprise system. The enterprise application communicates with a database management system 130, and stores its audited data in a database 150. The database management system 130 has a trigger function 140, which in this embodiment determines which data is persisted into the database 150.

Figure 2:
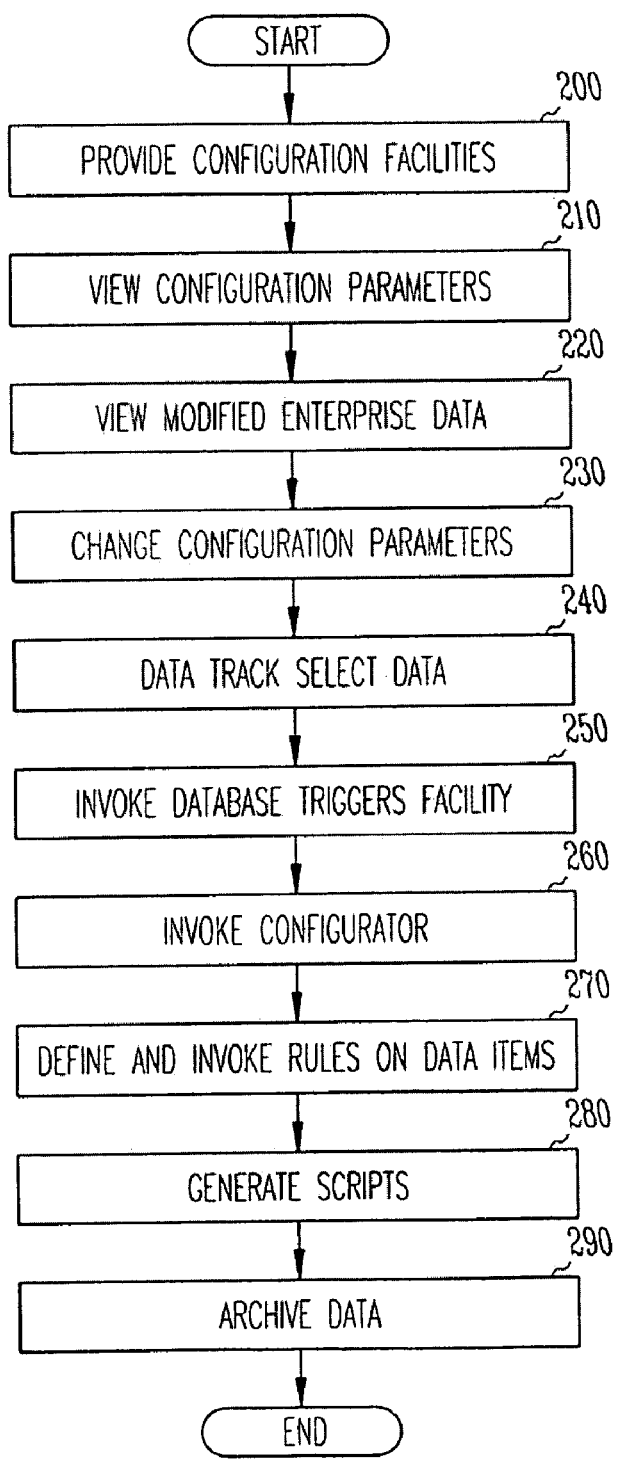
FIG. 2 is a flow chart of an embodiment of the invention.

Consequently, in an embodiment, the invention is able to properly balance the use of an audit trail in enterprise systems between corporate governance requirements and performance considerations. An embodiment of the invention as illustrated in FIG. 2 accomplishes this by providing appropriate configuration facilities 200 (See also No. 120 in FIG. 1), the ability to view configuration parameters (210), and the ability to view modified enterprise data in the process of changes to that enterprise data (220). One or more embodiments of the invention, which address the criticality of data in an enterprise system, could be implemented as a standard for all persisted data as part of enterprise application development.

In an embodiment, the audit trail component of an enterprise system is a non-invasive utility that assists system operators in keeping track of changes (240). The embodiment utilizes a database trigger functionality 140 of a typical database management system 130. By using database triggers of a database management system, the existing code of the application need not be altered (250). This maintains the integrity of the enterprise application. In another embodiment, a configurator generates these triggers (260). The configurator has the ability to specify logical entities (i.e., triggers) of the application, and these logical entities are then mapped to a set of physical tables in a database.

For example, in an embodiment, there may be a logical entity referred to as Purchase Order defined in the configurator. This Purchase Order entity can then be associated with a set of physical tables such as purchase order header and purchase item details. Using this embodiment, a system operator can choose to enable a set or subset of logical entities in terms of table columns. Then, upon invoking an audit function in conjunction with changes to enterprise data, only purchase order information will be tracked, not all information and data (240).

Rules may also be specified on data items that can be used to enable the tracking of data (270). For example, a sample rule may be to enable storage (i.e., tracking storage) only for orders greater than a particular amount. These rules are kept outside the boundary of the core application—i.e. the source and executable codes of the enterprise application need not and are not changed to check to determine if a purchase order is greater than a particular amount.

Figure 3:
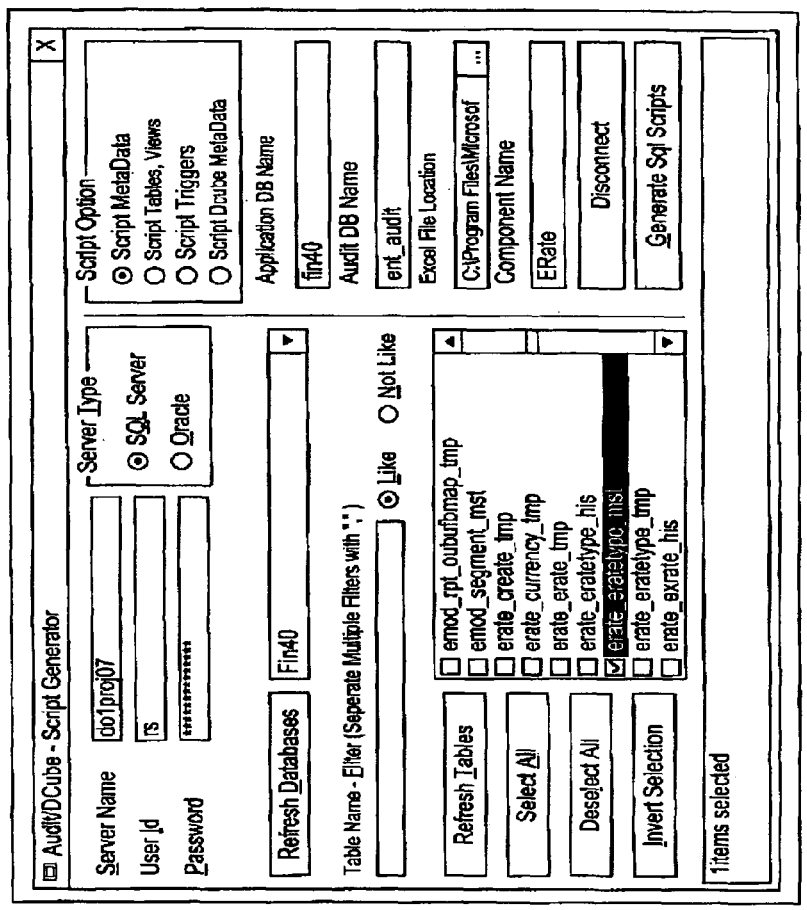
FIG. 3 is an example of a user interface that may be used in connection with an embodiment of the invention.

After the enterprise system is configured in an embodiment, facilities are available to generate table scripts (280) for storing the tracking information automatically from a system repository. An example of a user interface for such a facility is illustrated in FIG. 3. These scripts are generated by the utilities for all popular relational database management systems (RDBMS). Provisions for generating audit trail scripts for the configured entities are provided. This is also available in syntax compatible with all popular RDBMS databases. This is to ensure that the utility can cater to different types of configurations.

In an embodiment, to enable viewing of changes in enterprise data, the system automatically generates drill down views. The drill down utility has the ability to look at (i.e., drill down into) the history of changes in the system. However, as the number of transactions increase in the system, the number of entries in the audit table also increases. This leads to performance degradation on the system. To reduce the overhead, transactions utilities are provided that archive the audit data periodically into a set of tables where only the changed columns are stored and not the entire table structure of changes (290). This reduces the burden on OLTP (on line transaction processing) transactions and at the same time ensures that unnecessary data is not kept.

Figure 4:
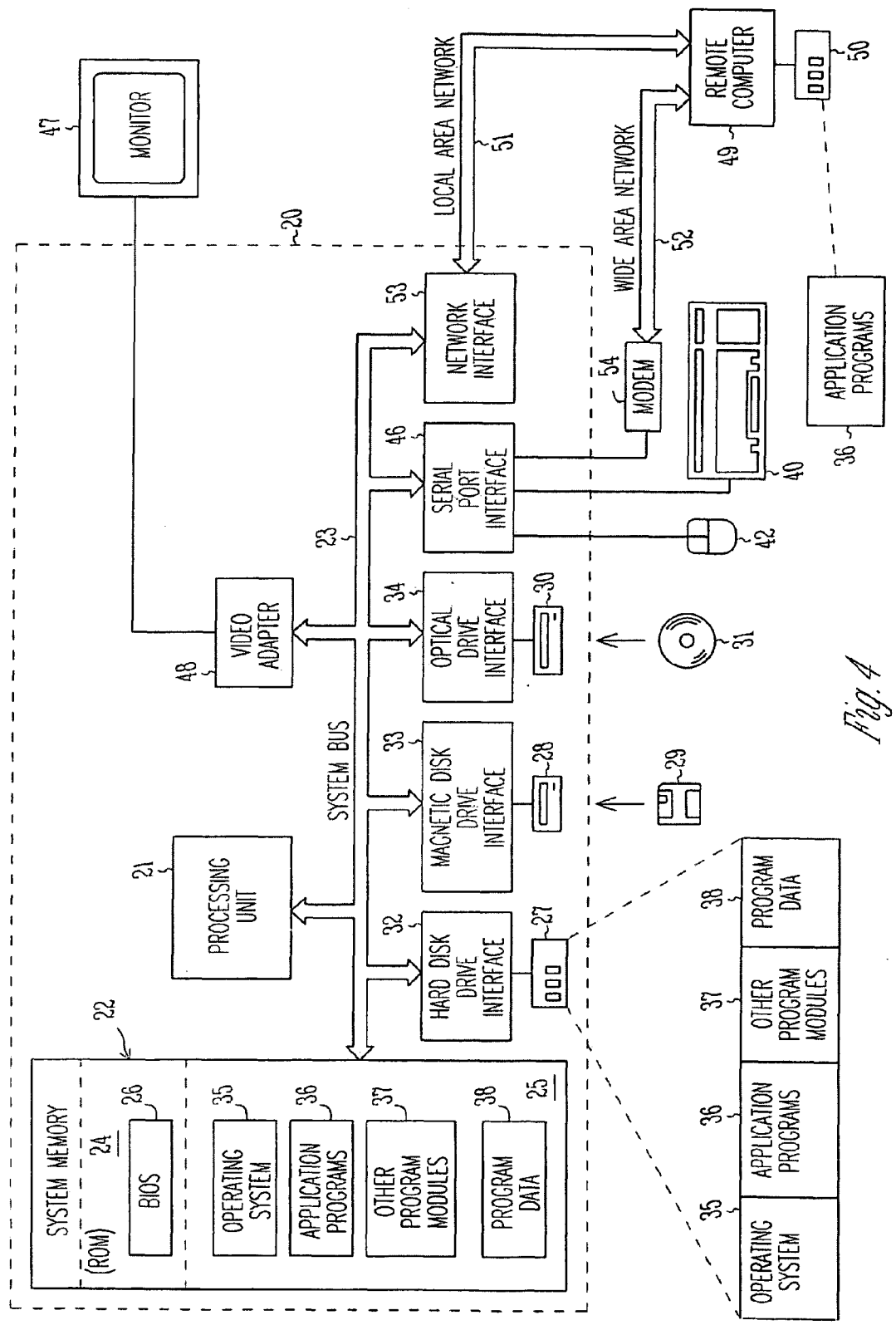
FIG. 4 illustrates an embodiment of a computer system upon which an embodiment of the present invention may operate.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figure.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A computer implemented method for auditing select enterprise data, stored in a database of a computer, of an enterprise application non-invasively, wherein the computer includes a processor and memory performing the method comprising:
   providing one or more configuration facilities to audit said enterprise data of said enterprise application;
   viewing configuration parameters in said one or more configuration facilities to audit changes in said enterprise data of said enterprise application, wherein said viewing configuration parameters automatically generates drill down views in said one or more configuration facilities to provide a history of said changes in said enterprise data;
   changing said configuration parameters so that auditing to changes of said enterprise data of said enterprise application is performed only on select enterprise data, wherein a set of rules specified on logical entities of said select enterprise data in said configuration parameters enable audit performed on changes to said select enterprise data;
   generating database triggers by invoking an audit trail component in said one or more configuration facilities to identify said changes to said select enterprise data in said database, wherein said one or more configuration facilities maps said logical entities of select enterprise data to a set of physical tables in said database, and wherein said database triggers are invoked in context of changes to said select enterprise data, and wherein said invoked database trigger's persists changes to select enterprise data in said audit trail component; and
   auditing said select enterprise data in context of changes using said database triggers and one or more configuration facilities non-invasively, and wherein said generated database triggers invoked based on said set of rules specified to said select enterprise data in said context of changes enable auditing changes non-invasively.

2. The method of claim 1, further comprising generating scripts for automatically storing tracking information from a system repository.

3. The method of claim 1, further comprising drilling down into said enterprise application and acquiring a history of changes from said drilling down.

4. The method of claim 1, further comprising archiving said select data, said select data that is archived being data that has been changed.

5. A system for auditing select enterprise data of an enterprise application non-invasively, the system comprising:
   processor; and
   memory operatively coupled to the processor, wherein said memory includes:
      an enterprise application comprising:
         an audit trail module to view audit trail of said enterprise data associated with said enterprise application; and
         at least one or more configuration facilities associated with said enterprise application, wherein said at least one or more configuration facilities enables to identify changes to enterprise data using configuration parameters for auditing, and wherein said configuration parameters are set to audit changes to select enterprise data of said enterprise application, and wherein a set of rules specified on logical entities of said select enterprise data in said configuration parameters enable audit performed on changes to said select enterprise data, and wherein said at least one or more configuration facilities automatically generates drill down views to provide a history of said changes in said enterprise data; and
      a database management system comprising:
         a database comprising enterprise data and audit trail data and wherein said configuration facility maps logical entities of select enterprise data to a set of physical tables in the database; and
         a database trigger function comprising database triggers, wherein said database triggers are generated by said audit trail module in based on said configuration parameters, and wherein said database triggers determines which select enterprise data is persisted into said audit trail data, and wherein said audit trail module enables to view said select enterprise data non-invasively using said database triggers and said configuration facility, and wherein said generated database triggers invoked based on said set of rules specified in context of changes to said select enterprise data enable auditing changes non-invasively.

6. The system of claim 5, wherein logical entities associated with said select enterprise data within said at least one or more configuration facilities are mapped to said database tables.

7. The system of claim 5, further comprising table scripts to automatically track data.

8. A computer readable medium comprising instructions thereon for executing a method for auditing select enterprise data of an enterprise application non-invasively, comprising:
   providing one or more configuration facilities to audit said enterprise data of said enterprise application;
   providing an ability to view configuration parameters in said one or more configuration facilities to audit changes in said enterprise data of said enterprise application, wherein said ability to view configuration parameters automatically generates drill down views in said one or more configuration facilities to provide a history of said changes in said enterprise data;

providing an ability to change said configuration parameters so that auditing to changes of said enterprise data of said enterprise application is performed only on select enterprise data, wherein said ability provides to specify a set of rules on logical entities of said select enterprise data in said configuration parameters enable audit performed on changes to said select enterprise data;

generating database triggers by invoking an audit trail component in said one or more configuration facilities to identify said changes to said select enterprise data in said database, wherein said one or more configuration facilities maps said logical entities of select enterprise data to a set of physical tables in said database, and wherein said database triggers are invoked in context of changes to said select enterprise data, and wherein said invoked database trigger's persists changes to select enterprise data in said audit trail component; and providing an ability to audit said select enterprise data in the context of changes to said enterprise data using said database triggers and one or more configuration facilities, and wherein said generated database triggers invoked based on said set of rules specified in said context of changes to said select enterprise data enable auditing changes non-invasively.

9. The computer readable medium of claim 8, further comprising instructions for generating scripts for automatically storing tracking information from a system repository.

10. The computer readable medium of claim 8, further comprising instructions for drilling down into said enterprise application and acquiring a history of changes from said drilling down.

11. The computer readable medium of claim 8, further comprising archiving said select data, said select data that is archived being data that has been changed.

* * * * *